(12) United States Patent
Komatsu et al.

(10) Patent No.: US 10,509,230 B2
(45) Date of Patent: Dec. 17, 2019

(54) VIRTUAL DISPLAY APPARATUS

(71) Applicant: SEIKO EPSON CORPORATION, Tokyo (JP)

(72) Inventors: Akira Komatsu, Tatsuno-machi (JP); Takashi Takeda, Suwa (JP); Toshiaki Miyao, Matsumoto (JP); Masayuki Takagi, Azumino (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/143,869

(22) Filed: Sep. 27, 2018

(65) Prior Publication Data

US 2019/0094519 A1 Mar. 28, 2019

(30) Foreign Application Priority Data

Sep. 28, 2017 (JP) .................. 2017-187593

(51) Int. Cl.
*G02B 27/01* (2006.01)
*G02B 25/00* (2006.01)
*H04N 13/332* (2018.01)
*G02B 5/02* (2006.01)

(52) U.S. Cl.
CPC ....... *G02B 27/0172* (2013.01); *G02B 5/0205* (2013.01); *G02B 25/001* (2013.01); *H04N 13/332* (2018.05)

(58) Field of Classification Search
CPC ... G02B 27/01–0189; G02B 2027/0105–0198; H04N 13/332
See application file for complete search history.

(56) References Cited

U.S. PATENT DOCUMENTS

| | | | | |
|---|---|---|---|---|
| 5,619,373 A | * | 4/1997 | Meyerhofer | G02B 27/0037 359/482 |
| 5,625,372 A | * | 4/1997 | Hildebrand | G02B 25/008 345/8 |
| 5,644,323 A | * | 7/1997 | Hildebrand | G02B 25/008 345/8 |
| 5,838,498 A | * | 11/1998 | Hildebrand | G02B 25/008 359/630 |
| 5,973,845 A | * | 10/1999 | Hildebrand | G02B 25/008 345/7 |
| 6,094,181 A | * | 7/2000 | Hildebrand | G02B 27/0172 345/8 |
| 8,310,764 B2 | * | 11/2012 | Tanijiri | G02B 5/0221 359/630 |
| 2002/0034710 A1 | * | 3/2002 | Morris | G02B 3/0043 430/321 |

(Continued)

FOREIGN PATENT DOCUMENTS

| | | |
|---|---|---|
| EP | 3249444 A1 | 11/2017 |
| JP | 2016-139112 A | 8/2016 |

*Primary Examiner* — Gene W Lee
(74) *Attorney, Agent, or Firm* — Oliff PLC (57) ABSTRACT

By configuring a micro structure portion, an image display device, and an eyepiece optical system to satisfy Expression (1), a diffusion effect of an appropriate extent can be imparted to image light with a relatively simple configuration, by taking into account the size of each of pixels constituting the image display device that is an image element, gaps between the pixels are made less noticeable, and a favorable state of visibility of an image can be obtained.

10 Claims, 9 Drawing Sheets

(56) References Cited

U.S. PATENT DOCUMENTS

| | | | |
|---|---|---|---|
| 2011/0181960 A1* | 7/2011 | Tanijiri | G02B 5/0221 |
| | | | 359/630 |
| 2017/0010473 A1* | 1/2017 | Ide | G02B 3/0056 |
| 2017/0059861 A1* | 3/2017 | Furuya | G02B 27/104 |
| 2017/0255015 A1* | 9/2017 | Geng | G02B 6/0008 |
| 2017/0261748 A1* | 9/2017 | Powell | G02B 5/13 |
| 2018/0106930 A1* | 4/2018 | Uchida | G02B 3/0043 |
| 2018/0172897 A1* | 6/2018 | Min | G02B 27/28 |
| 2018/0292656 A1* | 10/2018 | Geng | G02B 27/0172 |
| 2019/0094550 A1* | 3/2019 | Takagi | G02B 27/0172 |

* cited by examiner

VIRTUAL DISPLAY APPARATUS

The present application is based on and claims priority from JP Application Serial Number 2017-187593, filed Sep. 28, 2017, the disclosure of which is hereby incorporated by reference herein in its entirety.

BACKGROUND

1. Technical Field

The disclosure relates to a virtual display apparatus mounted on the head of an observer that provides, to the observer, an image formed by an image element and the like.

2. Related Art

In recent years, in a virtual display apparatus, such as a head mounted display (hereinafter also referred to as an HMD, or a head mounted display device) and the like that is mounted on the head of the observer, in order to obtain a wider viewing angle, progress is being made in magnifying an image and causing the magnified image to be viewed.

There is an issue that, in line with the magnification of the image, in an image element and the like, black matrices disposed between pixels, for example, are also magnified, and are visually recognized by the observer. Here, a method is known in which gaps between the pixels are made less noticeable by performing magnification by each of lens portions of a micro lens array sheet, for example (as disclosed in JP-A-2016-139112).

However, in the above-described case, since the micro lens array sheet having a width smaller than each of the pixels is disposed, it may be more difficult to create the micro lens array sheet with a high degree of accuracy as the pixel pitch becomes smaller.

Further, in the above-described case, since the micro lens array sheet is disposed close to the image element and the like, when the micro lens array sheet is not disposed with a high degree of accuracy, moire effects may occur.

SUMMARY

The disclosure provides a virtual display apparatus capable of obtaining a favorable state of visibility of an image in which gaps between pixels are made less noticeable, with a relatively simple structure.

A first virtual display apparatus of the disclosure includes an image element configured to emit image light, an eyepiece optical system configured to cause the image light from the image element to be visually recognized as an image of a virtual image, and a micro structure portion provided on the eyepiece optical system and configured to diffuse the image light. The virtual display apparatus satisfies an expression below:

$$0.2 \frac{t}{f} < \Delta n \tan\theta < \frac{t}{f}$$

where $\Delta n$ is a refraction index difference of a medium before and after a micro structure surface of the micro structure portion, $\theta$ is a maximum inclination angle of the micro structure surface with respect to an optical axis, $t$ is a width of a single pixel constituting the image element, and $f$ is a focal distance of a whole optical system.

In the above-described virtual display apparatus, by providing the micro structure portion that satisfies the above-described conditions, the appropriate extent of the diffusion effect can be imparted to the image light, by taking into account the size of each of the pixels constituting the image element, the gaps between the pixels are thus made less noticeable, and the favorable state of visibility of the image can be obtained.

According to a specific aspect of the disclosure, the micro structure portion may include a concavity and a convexity that are finer than a width of a luminous flux of the image light corresponding to the width $t$ of the single pixel constituting the image element. In this case, at least one or more of the concavities and convexities of the micro structure portion operate on an image corresponding to the single pixel, and thus, the reliable diffusion effect can be imparted.

According to a another aspect of the disclosure, the micro structure portion may include a concave-convex structure portion constituted by the concavity and the convexity of a size within a range from 0.05 mm to 2 mm. In this case, as well as making the manufacture of the concave-convex structure portion that constitutes the micro structure portion relatively easy, the concavities and convexities can be formed in a chosen size.

According to a still another aspect of the disclosure, in the micro structure portion, the concave-convex structure portion may include the concavity and the convexity having different sizes within the range, and being aperiodically disposed. In this case, the appropriate diffusion effect can be imparted.

According to a still another aspect of the disclosure, the micro structure portion may be formed on a surface closest to an observer side, of the eyepiece optical system. In this case, the diffusion effect can be imparted to the image light at its most magnified state along the optical path.

According to a still another aspect of the disclosure, the micro structure portion may be provided on a resin lens, of lenses constituting the eyepiece optical system, and may be formed to join another lens constituting the eyepiece optical system. In this case, by being provided on the resin lens, the manufacture of the micro structure portion is made relatively easy, and in addition, by being joined with the other lens, the attachment of dirt and the like to the micro structure portion can be avoided.

According to a still another aspect of the disclosure, the eyepiece optical system may be constituted by at least one of a resin lens and a glass mold lens.

According to a still another aspect of the disclosure, the micro structure portion may be a sheet-shaped diffusion member. In this case, the micro structure portion can be easily attached to the eyepiece optical system.

According to a still another aspect of the disclosure, the micro structure portion may be provided only on a part, at a center side, of an effective diameter of a lens constituting the eyepiece optical system. In this case, a range over which the micro structure portion is provided is limited, thus providing a simple structure, and at the same time, in relation to human power of vision, a state of an image of an effective visual field, which is optimum for information receptivity, can be maintained.

According to the above-described virtual display apparatus, by providing the micro structure portion that satisfies the above-described conditions, the appropriate extent of the diffusion effect can be imparted to the image light with a relatively simple structure, by taking into account the size of each of the pixels constituting the image element, the gaps between the pixels are thus made less noticeable, and the favorable state of visibility of the image can be obtained.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

First Exemplary Embodiment

Below, a virtual display apparatus according to First Exemplary Embodiment of the disclosure will be described in detail with reference to FIG. 1 and the like.

Figure 1:
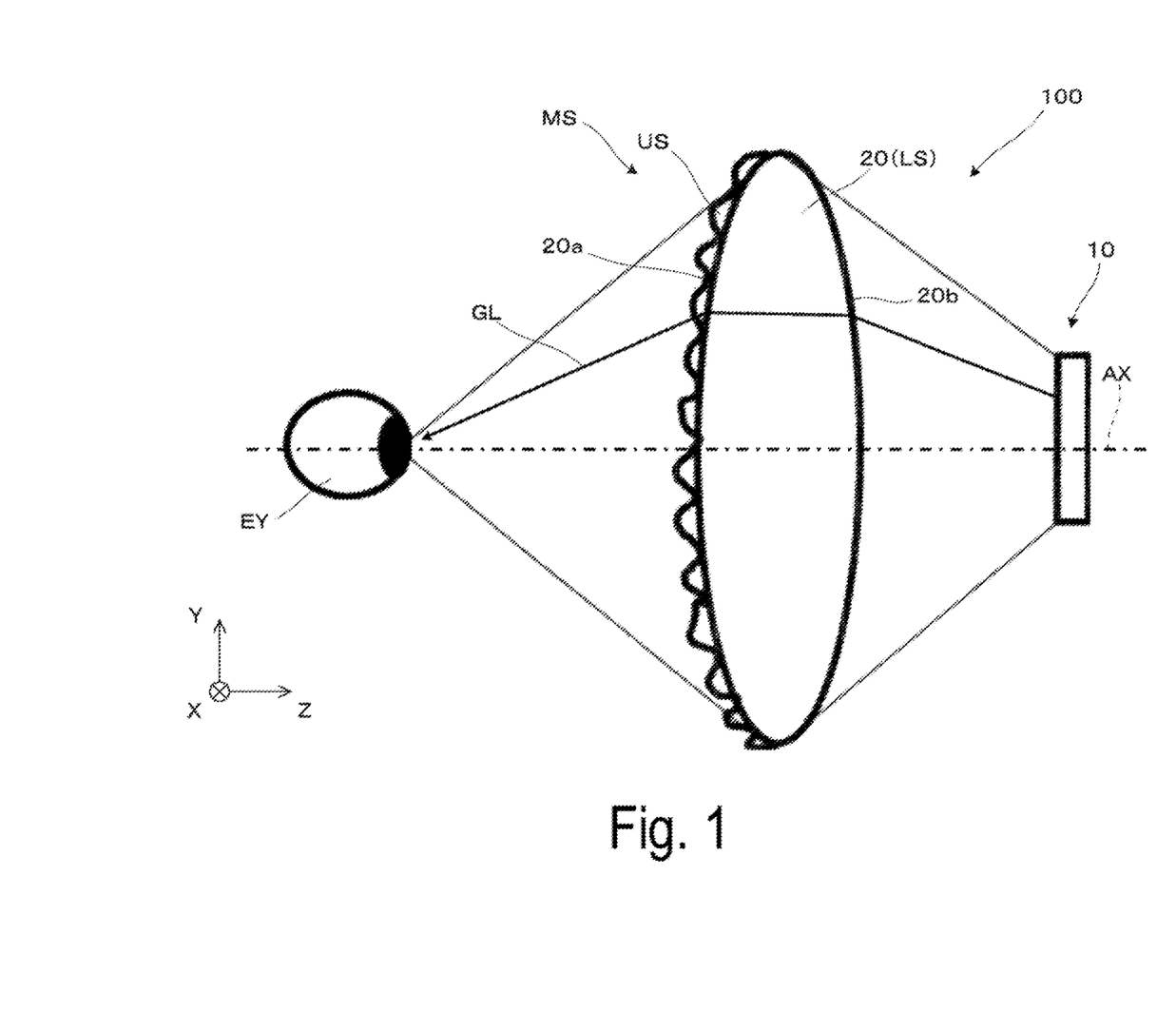
FIG. 1 is a cross-sectional diagram schematically illustrating a virtual display apparatus according to First Exemplary Embodiment.

As schematically illustrated in FIG. 1, a virtual display apparatus 100 of First Exemplary Embodiment includes an image display device 10 that is an image element, and an eyepiece optical system 20, and is a head mounted display (HMD or head mounted display device) that can cause an observer or a user wearing the virtual display apparatus 100 to visually recognize image light resulting from a virtual image. Further, in First Exemplary Embodiment, the virtual display apparatus 100 includes a micro structure portion MS that is provided on the eyepiece optical system 20 and that diffuses the image light from the image display device 10. The micro structure portion MS includes many minute concavities and convexities, and thus demonstrates diffusion effect. Note that, although not illustrated, the image display device 10 and the eyepiece optical system 20 are accommodated in and protected by an exterior portion that covers the front of the eyes of the observer when worn. Here, in the virtual display apparatus 100, an optical axis AX of the optical system is a Z direction. Further, the optical axis AX passes through a center position of an image display area of the image display device 10. Further, here, as illustrated, the Z direction is assumed to be along the direction of orientation of the observer looking straight forward, and the optical axis AX is an axis at which an angle of view (a viewing angle) of an eye EY of the observer is 0 degrees. In other words, the optical axis AX is aligned with a typical visual axis of the eye EY of the observer. In addition, the horizontal direction that is the direction in which the left and right eyes EY of the observer are aligned side by side, is an X direction. In other words, the direction corresponding to the alignment direction of the eyes EY, namely, the left-right direction, is the horizontal direction, and the virtual display apparatus 100 is configured based on this premise. In the drawings, this is the X direction. Furthermore, a direction orthogonal to the horizontal direction is a perpendicular direction that is the up-down direction for the observer, and in FIG. 1 and the like, this is a Y direction.

Below, an optical path of image light GL by the virtual display apparatus 100 will be briefly explained. First, the image light GL emitted from the image display device 10 passes through the eyepiece optical system 20 and further, through the micro structure portion MS attached to the eyepiece optical system 20, and reaches a position that is assumed to be a location of the eye EY of the observer.

Below, an example will be conceptually explained of structures and the like of each of portions for the optical guiding of the image light GL by the virtual display apparatus 100.

Figure 2:
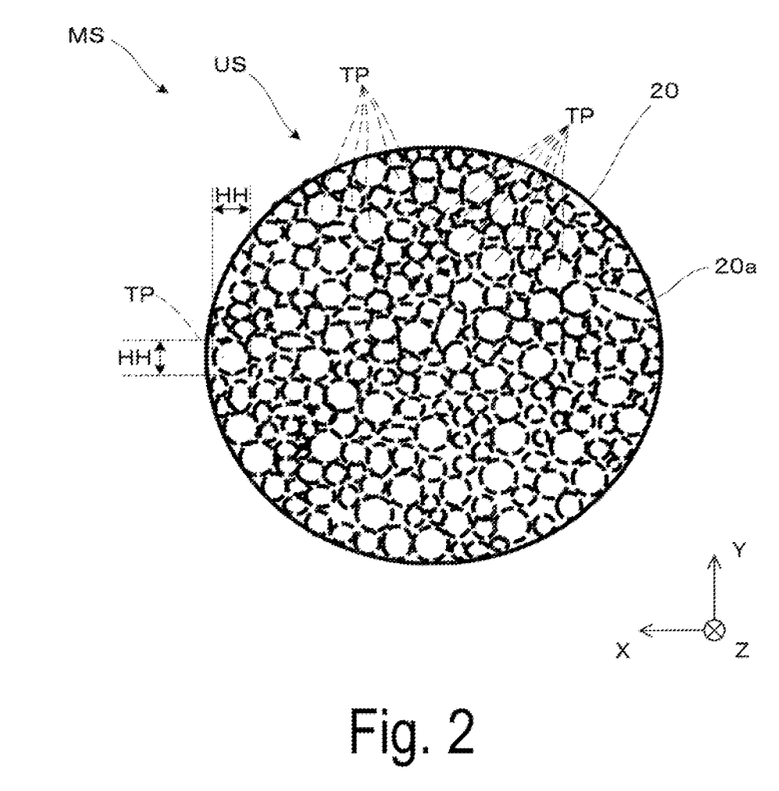
FIG. 2 is a diagram schematically illustrating an example of a micro structure portion in the virtual display apparatus.

FIG. 1 illustrates a state of a cross-section at the optical axis AX as seen from the side, when the observer is wearing the virtual display apparatus 100. FIG. 2 is a diagram illustrating a state of the micro structure portion MS provided on the eyepiece optical system 20. Note that, in FIG. 1 and FIG. 2, for the sake of explanation, the many concavities and convexities constituting the micro structure portion MS, namely, a concave-convex structure US, is illustrated in an exaggerated manner. In actuality, the concave-convex structure US is a structure constituted by significantly minute concave-convex portions. The micro structure portion MS is formed by attaching a material that is the concave-convex structure US to the surface of the eyepiece optical system 20, by fusion, bonding, and the like.

Note that the image display device 10, the eyepiece optical system 20, and the micro structure portion MS each have a pair of left and right configurations respectively prepared for the right eye and the left eye (excluding asymmetry caused by minute differences in the left and right concavities and convexities in the micro structure portion MS). Due to the symmetry, here, only one of the left and right configurations is illustrated (for the left eye), and the other configuration is omitted. In other words, in FIG. 1, the positive X side is an outer side (a side toward the ear), and a negative X side is an inner side (a side toward the nose). Note that only one of the left and right pair of structures also functions as the virtual display apparatus, namely, functions independently. Further, although not described in detail, the virtual display apparatus can also be configured for a single eye without adopting the left and right pair of configurations as exemplified in FIG. 1.

The image display device 10 is an image element (an image display device or an image display portion) for displaying images. Specifically, as an image display portion that displays the images, the image display device 10 is a device that performs image formation on a panel portion that is a main body section, and emits the image light GL, which is the image light formed, while converting the state of polarization as appropriate. The image display device 10 can be constituted by the image element that is constituted by a self-emitting device (OLED), such as an organic EL device. Further, in addition to the image element that is a transmission-type spatial light modulating device, for example, the image display device 10 may have a configuration including an illumination device (not illustrated) that is a backlight configured to emit illumination light to the image element, and a driving control unit (not illustrated) configured to control operations. Further, in First Exemplary Embodiment, as the image display device 10, a micro display for which the length of one side is equal to or less than one inch is adopted as a panel.

With respect to the optical path of the image light GL, the eyepiece optical system 20 is disposed on a downstream stage of the optical path of the image display device 10 (the negative Z side), and is disposed in front of the eye of observer when worn, and causes the image light GL from the image display device 10 to be emitted to the observer side. The eyepiece optical system 20 is a non-telecentric optical system, and is a magnifying optical system that causes the observer to visually recognize, as a virtual image magnified, an image displayed by the image display device 10. Note that, in this example, in order to simplify the explanation, the eyepiece optical system 20 is constituted by a single lens LS, but in addition to a configuration with a single lens or a plurality of lenses, for example, the eyepiece optical system 20 may have a structure which is constituted by a lens as a main component and optical components such as a polarization converting member, and a semi-transparent polarizing plate, and reflect back some light. Other configuration examples will be described separately in detail below. Further, the lens LS may be constituted by either a zero birefringence resin lens or a low birefringence resin lens with an orientation birefringence of ±0.01 or less, or a photoelastic constant of $[10^{-12}/Pa]$ or less, for example, and birefringence is thus unlikely to occur.

The lens LS that constitutes the eyepiece optical system 20 can also be said to be an observer side lens that is located facing a position assumed to be the position of the eye EY of the observer (in this application, this position is also illustrated as the eye EY). Specifically, the lens LS is a convex lens that focuses the image light GL from the image display device 10 and causes the image light GL to be emitted to the front of the eye of the observer. Note that, the lens LS is conceivably made of a resin or a glass mold, but here, as an example, a resin lens in which the above-described birefringence is sufficiently reduced is adopted.

Here, an example is given of a magnitude correlation between the sizes of the image display device 10 and the eyepiece optical system 20 (the lens LS). Here, as illustrated, the size of an optical surface of the eyepiece optical system 20 is larger than the size of the image display area of the image display device 10. Specifically, a lens effective diameter in the lateral direction (the X direction) or in the vertical direction (the Y direction) of the lens LS, which corresponds to the size of the optical surface of the circular lens LS, is larger than a panel size in the lateral direction (the X direction) or in the vertical direction (the Y direction), which corresponds to the size of the image display area of the image display device 10. In accordance with this, the eyepiece optical system 20 is a divergence-type non-telecentric optical system. In this way, an overall image height can be made smaller, and specifically, the image of the image display device 10 that uses the small panel, such as the micro display for which the length of one side is equal to or less than one inch (approximately 12 to 13 mm, for example), can be magnified and a wide angle image can be formed.

A main component of the micro structure portion MS is the concave-convex structure portion US that is provided by forming, for example, many convex portions TP, TP, and the like, on a lens surface 20a or a lens surface 20b of the eyepiece optical system 20 (the lens LS) constituted by the resin lens. Note that, in the illustrated example, of the eyepiece optical system 20, the concave-convex structure portion US is formed on the lens 20a that is the surface closest to the observer. As illustrated in FIG. 1 or FIG. 2, the micro structure portion MS demonstrates the diffusion effect with respect to the passing light, with the concave-convex structure portion US that includes the many concavities and convexities. In the example illustrated in FIG. 2, the many hemispherical convex portions TP, TP, and so on are arranged in a two-dimensional shape over the entire lens surface 20a of the eyepiece optical system 20, thus constituting the concave-convex structure portion US. Here, the many convex portions TP, TP, and so on may be different in size to a certain extent and disposed in an aperiodic (random) manner, for example. In particular, here, the size of each of the convex portions TP is appropriately set such that a diameter (width) HH of the convex portion TP in the illustrated XY plane is from 0.05 mm to 2 mm, taking into account the size of the pixels constituting the image display device 10, the size of the black matrices constituting the spaces between the pixels, and furthermore, a focal distance of the whole optical system.

Here, in general, in the virtual display apparatus such as the HMD, progress is being made in achieving a wider viewing angle, and, for example, devices exist in which a maximum value of an angle of view (a field of view (FOV), or a viewing angle) exceeds 50 degrees. In First Exemplary Embodiment also, the maximum value of the field of view (FOV) is designed to exceed 50 degrees. In accordance with this widening of the viewing angle, the image of the image display device 10 is enlarged to a greater extent to be visually recognized. However, in the image display device 10, the black matrices disposed between the pixels are also magnified, for example, and may be visually recognized by the observer, and there is a demand to make the gaps between the pixels less noticeable in order to avoid this.

In First Exemplary Embodiment, taking the above-described viewpoint into account, by providing the micro structure portion MS having a shape satisfying predetermined conditions in accordance with the configuration of the optical system, an appropriate extent of the diffusion effect can be imparted to the image light GL while taking into account the size of each of the pixels constituting the image display device 10. In this way, a favorable state of visibility of the image that is not too blurred can be obtained, while moderately blurring the image and making the gaps between the pixels less noticeable.

Figure 3:
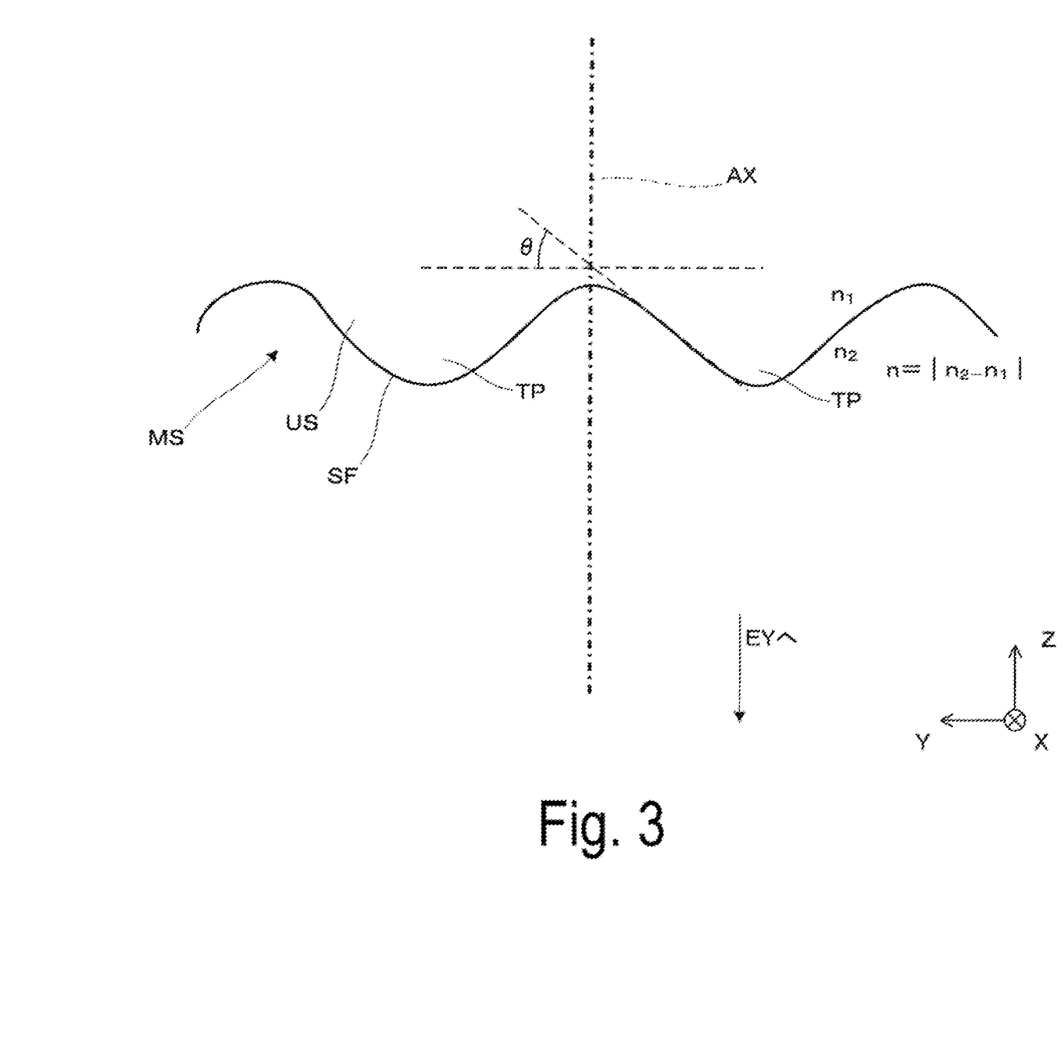
FIG. 3 is a diagram illustrating a state of a concave-convex structure portion constituting the micro structure portion.

Below, with reference to FIG. 3, FIGS. 4A and 4B, and the like, the shape and structure of the micro structure portion MS, and a relationship between the micro structure portion MS and the pixels constituting the image display device 10 as the image element in First Exemplary Embodiment will be described.

First, the shape and structure, and the diffusion effect of the concave-convex structure portion US constituting the micro structure portion MS will be described with reference to FIG. 3. As described above, the concave-convex structure portion US constituting the micro structure portion MS has the shape including the many concavities and convexities with the exemplified many convex portions TP and the like. This concave-convex shape (or corrugated shape) is not limited to the kind of shape exemplified in FIG. 2 (convex portions that are circular in a front view), and various concave-convex shapes may be adopted, such as the concave-convex shape having the cross section illustrated in FIG. 3, for example. Here, in FIG. 3, of a surface SF of the concave-convex structure portion US (or the micro structure portion MS), an inclination angle at a position that is most inclined with respect to the optical axis AX (a maximum inclination angle) is defined as $\theta$. Here, as a typical example of the diffusion effect, the diffusion effect of the micro structure portion MS will be considered with respect to a light beam that is parallel to the optical axis AX and that passes through a surface obtaining the maximum inclination angle $\theta$. Further, various other values are prescribed as follows. First, a refractive index difference between a medium on one side and a medium on the other side of the surface SF of the micro structure portion MS is denoted by $\Delta n$. Specifically, in the illustrated case, the refractive index of the resin material constituting the micro structure portion MS is denoted by $n_1$, and the refractive index of a section of air layer after passing through the micro structure portion MS is denoted by $n_2$. In this case, the refractive index difference $\Delta n$ is $|n_2-n_1|$. Further, the focal distance of the whole optical system constituting the virtual display apparatus 100 is denoted by f. In addition, as illustrated in FIG. 4A, for pixels PX, PX, and so on disposed in a matrix shape and constituting the image display device 10, a width of each of the pixels PX is denoted by t.

Figure 4A:
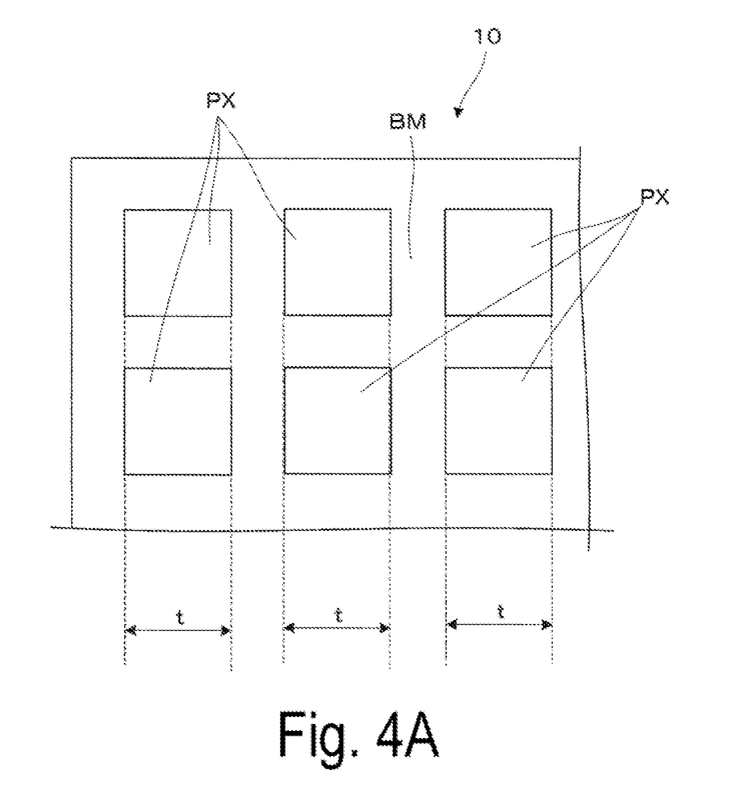
FIG. 4A is a schematic plan view illustrating an example of a state of pixels constituting an image element.
Figure 4B:
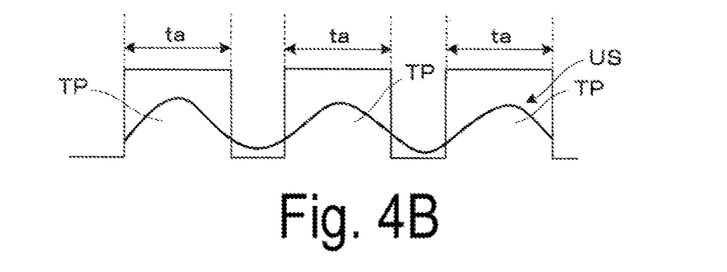
FIG. 4B is a schematic plan view illustrating a relationship between the pixels constituting the image element and the concave-convex structure portion.

In the above case, although dependent on the size and the like of a black matrix BM that isolates each of the pixels PX illustrated in FIG. 4A, as the diffusion effect, blurring is performed to an extent that the gaps caused by the black matrix BM are made less noticeable. Specifically, even while diffusing the light from each of the pixels PX, the extent of diffusion of the light is suppressed in order to maintain a level of resolution in accordance with the pixel configuration. As a condition to achieve this, in relation to each of the above-described prescribed values, $$0.2 \frac{t}{f} < \Delta n \tan\theta < \frac{t}{f} \quad (1)$$

is to be satisfied. Here, of the above Expression (1), t/f appearing on the left and right sides indicate, based on the above-described prescribed values, a ratio (degree) of the width t of the pixel PX to the focal distance f. Meanwhile, a value of the center term of the above Expression (1) is a product of the refractive index difference $\Delta n$ and the tangent of the maximum inclination angle $\theta$, and indicates a degree of the diffusion effect imparted to the light beam that is parallel to the optical axis AX at the position at which the maximum inclination angle $\theta$ is obtained when the light beam passes through the micro structure portion MS. Thus, the above Expression (1) indicates that the material and, the shape and the configuration of the micro structure portion MS is set such that the degree of the diffusion effect, at the micro structure portion MS, is approximately within a range from 0.2 to 1 times the degree of the ratio of the width t to the focal distance f. In other words, the extent of the diffusion effect by the micro structure portion MS is approximately 0.2 of a pixel to 1 pixel, in the image that is visually recognized as the display image. In the above-described case, by having the diffusion effect at the micro structure portion MS within the range prescribed by the above Expression (1), while causing the gaps between the pixels generated by the black matrix BM to be less perceived, a deterioration in the visual resolution due to adjacent pixels being mixed together can also be avoided.

Note that when the magnitude of the maximum inclination angle $\theta$ is relatively small, while taking into account the relationship of $\theta \approx \sin\theta \approx \tan\theta$ and the like, the value of the center term of the above Expression (1) may also be a product of the refraction index difference $\Delta n$ and the maximum inclination angle $\theta$.

Further, in order to deploy the diffusion effect of the above-described extent without unevenness at each of the pixels PX, it is conceivable that, with respect to each one of the concavities and convexities constituting the micro structure portion MS, at least one of the concavities and convexities be approximately of a size to be contained within the image corresponding to each of the pixels. Specifically, it is conceivable that the concave-convex structure portion US (or the micro structure portion MS) be constituted by concavities and convexities that are finer than the width of a luminous flux of the image light GL corresponding to the width t of the single pixel PX. Typically, as conceptually illustrated in FIG. 4B, one of the convex portions TP may correspond to a width to of the luminous flux which is a component of the image light GL corresponding to the width t of the single pixel PX, and the component when passing through the concave-convex structure portion US. Namely, it is conceivable that the pitch of the convex portions TP and the pitch of the luminous flux be aligned with each other. Alternatively, as illustrated in FIG. 5, the concave-convex structure portion US may include the concavities and convexities that are finer than the width of the luminous flux that is a component of the image light GL, and the component when passing through the concave-convex structure portion US.

Figure 5:
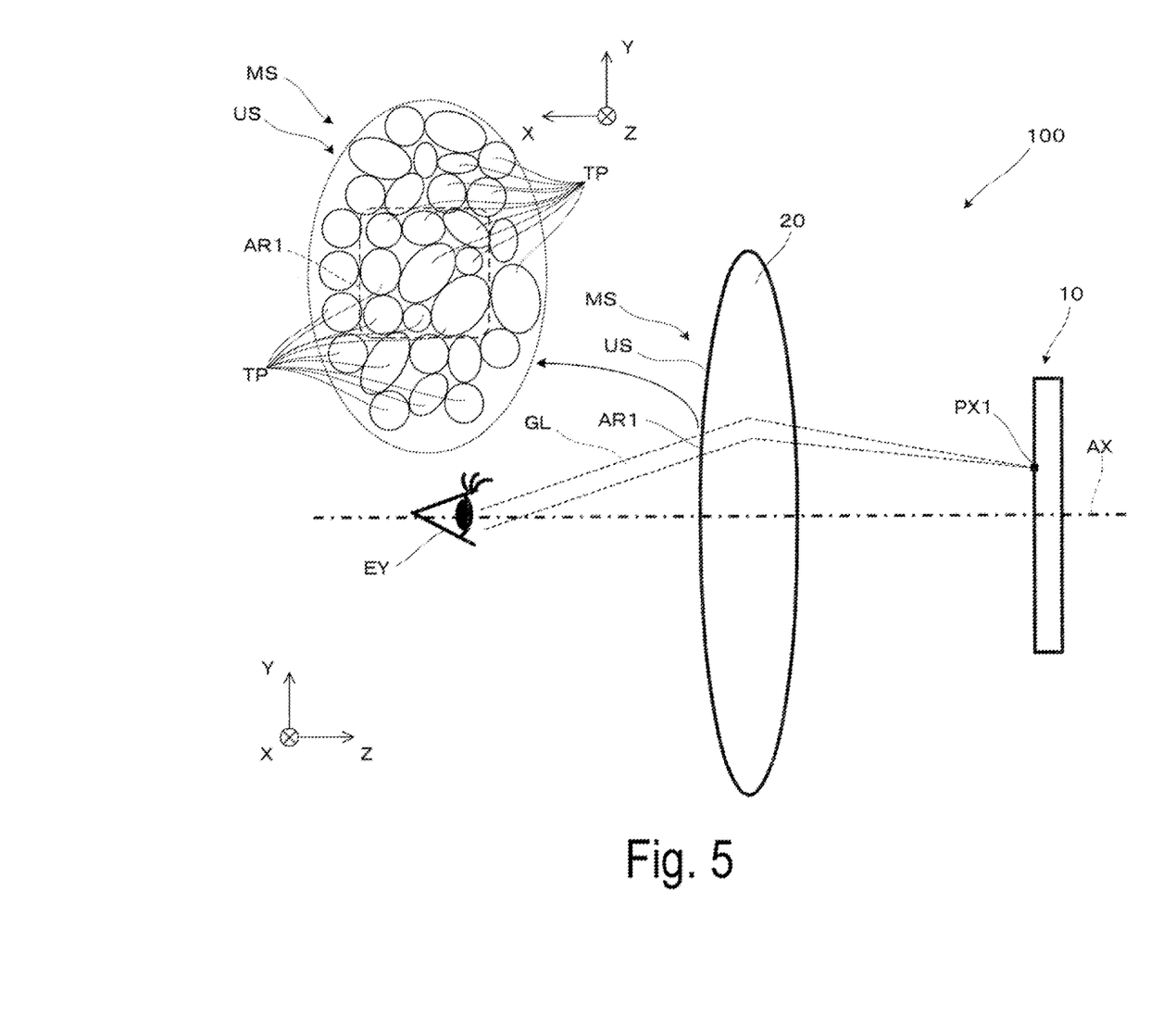
FIG. 5 is a diagram illustrating a relationship between component light corresponding to the pixels constituting the image element and the concave-convex structure portion, in a variation example of the virtual display apparatus.

FIG. 5 is a diagram illustrating a relationship between a component light GL1 corresponding to a pixel PX1 constituting the image display device 10 in a variation example of the above-described virtual display apparatus 100, and a location of the concave-convex structure portion US corresponding to the component light GL1. As illustrated, here, the component light GL1 of the image light GL is emitted from the pixel PX1 that is one of the pixels constituting the image display device 10. In this case, the component light GL1 reaches the eye EY of the observer while the width of the luminous flux is widened by the eyepiece optical system 20 as the magnifying optical system. Specifically, the closer to the eye EY of the observer, the wider the luminous flux of the component light forming the image corresponding to the single pixel. Here, a range over which the component light GL1 passes through the micro structure portion MS is referred to as an area AR1. In FIG. 5, as depicted by surrounding dashed lines, the area AR1 and a peripheral area of the area AR1 are partially enlarged and illustrated. Here, as an example, inside the area AR1, the concave-convex structure portion US is formed to include approximately 3 of the convex portions TP in each direction, namely, to include approximately 3 concavities and convexities in each of the directions. In this way, with respect to the image corresponding to the single pixel PX1, a sufficient diffusion effect can be imparted without any unevenness.

Further, in the above-described case, the micro structure portion MS is formed on the lens surface 20a that is the surface on the side closest to the observer, of the eyepiece optical system 20, and thus the diffusion effect can be imparted to the image light GL in a state of being magnified to the greatest extent in the optical path. Specifically, the micro structure portion MS does not have to be formed to be approximately the same fineness as each of the pixels and to a high degree of accuracy, as is the case where the micro lens array sheet adheres to the immediate vicinity of each of the pixels constituting a known image element.

As described above, in First Exemplary Embodiment, by configuring the micro structure portion MS, the image display device 10, and the eyepiece optical system 20 to satisfy the above Expression (1), the appropriate extent of the diffusion effect can be imparted to the image light GL with a relatively simple configuration taking into account the size of each of the pixels PX constituting the image display device 10 that is the image element, the gaps between the pixels PX are made less noticeable, and the favorable state of visibility of the image can be obtained.

Second Exemplary Embodiment

Below, a virtual display apparatus according to Second Exemplary Embodiment of the disclosure will be described with reference to FIG. 6. In Second Exemplary Embodiment, an example will be described in which an eyepiece optical system is mounted, which was not described in detail in First Exemplary Embodiment. Specifically, an example will be described of the eyepiece optical system of the virtual display apparatus that is configured by a plurality of lenses, and the lenses are the main components of the eyepiece optical system, but the eyepiece optical system has a structure in which some light is reflected back, by being constituted by optical components such as a polarization converting member, and a semi-transparent polarizing plate. Note that FIG. 6 illustrates a state of a cross section at the optical axis AX as seen from above, when the observer is wearing the virtual display apparatus.

Figure 6:
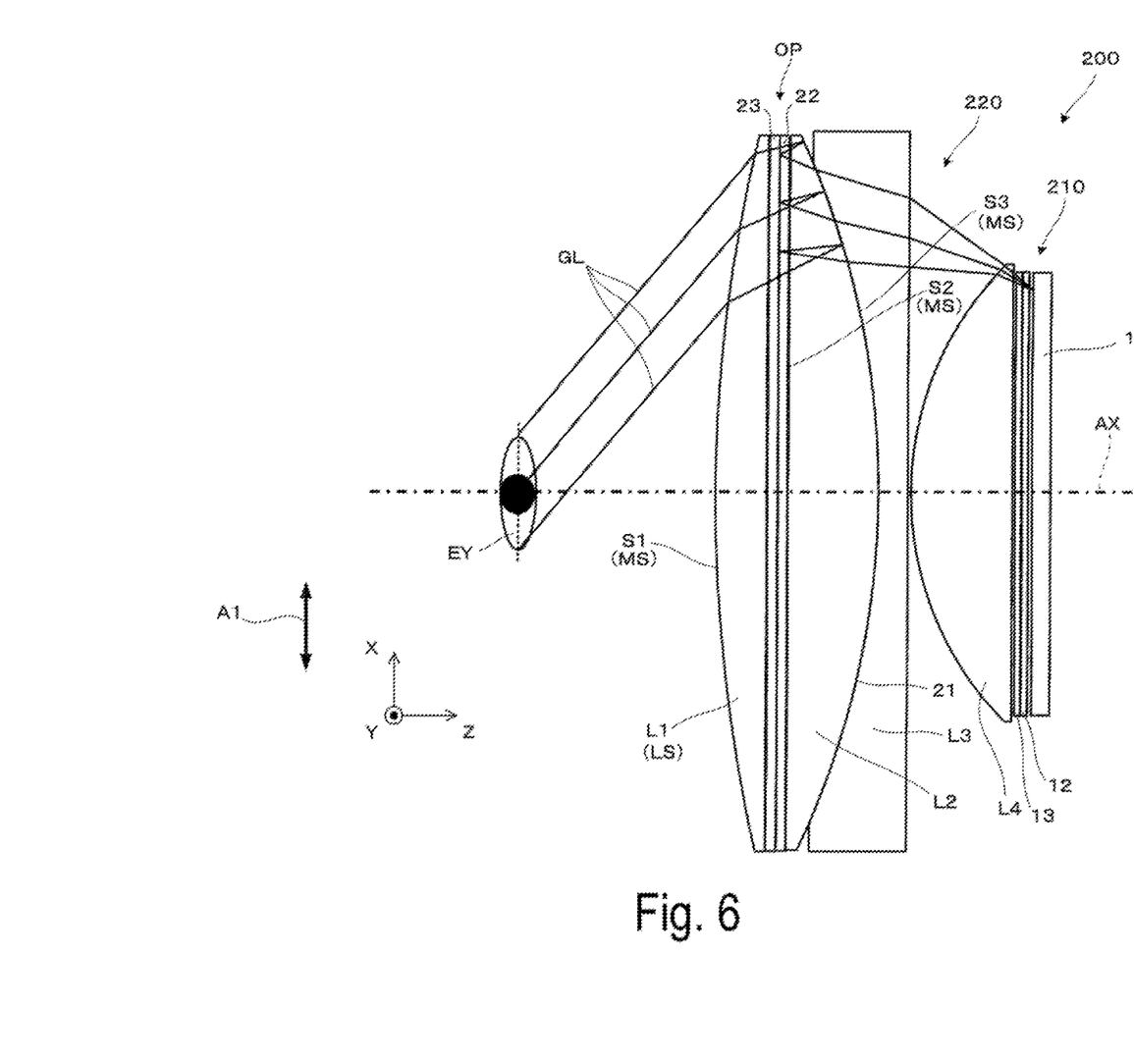
FIG. 6 is a diagram illustrating the virtual display apparatus according to Second Exemplary Embodiment.

A virtual display apparatus 200 according to Second Exemplary Embodiment illustrated in FIG. 6 includes an image display device 210 that is the image element, an eyepiece optical system 220, and the micro structure portion MS. Note that the micro structure portion MS is provided on the lens surface of one of the lenses constituting the eyepiece optical system 220, and can be formed on any one of lens surfaces S1 to S3 in FIG. 6, for example.

The image display device 210 includes a panel unit 11 which is a main body unit configured to perform the image formation, a polarizing plate 12 configured to extract components of linearly polarized light, and a first quarter wave plate (λ/4 board) 13 configured to convert a component that has passed through the polarizing plate 12 to circularly polarized light and emits the circularly polarized light.

The panel unit 11 can be configured, for example, by a self-emitting device (OLED) such as an organic EL device. Further, in addition to the image display device (image element) that is the transmission-type spatial light modulating device, for example, a configuration may be adopted that includes an illumination device (not illustrated) that is a backlight for emitting illumination light to the image display device, and a driving control unit (not illustrated) configured to control operations.

The polarizing plate 12 converts, of the light from the panel unit 11, the image light to be emitted to the linearly polarized light. In addition, the first quarter wave plate 13 converts the component that has passed through the polarizing plate 12 to the circularly polarized light.

By adopting the type of configuration described above, the image display device 210 emits the image light GL that is circularly polarized.

In addition to four first to fourth lenses L1 to L4 arranged in this order from the observer side, the eyepiece optical system 220 includes a half mirror 21, and an optical element OP. The optical element OP is constituted by a polarization converting member 22, and a semi-transparent polarizing plate 23. Of the above members, excluding the fourth lens L4, the first to third lenses L1 to L3, the half mirror 21, and the optical element OP adhere together as a unit, as illustrated. Note that, of the first to fourth lenses L1 to L4, at least the second lens L2 is constituted by either a zero birefringence resin lens or a low birefringence resin lens, and is favorably a lens in which birefringence is unlikely to occur, while some of the first to fourth lenses L1 to L4 may be made of resin and the others of the first to fourth lenses L1 to L4 may be made of a glass mold.

Of the eyepiece optical system 220, the first lens L1 is an observer side lens that is disposed in a position closest to the position of the eye EY of the observer. Note that the first lens L1 that is the observer side lens is a convex lens that focuses the image light GL and causes the image light GL to be emitted to the front of the eye of the observer.

The second lens L2 is disposed upstream in a relative relationship with the first lens L1, and is a lens that causes the image light GL from the image display device 210 to be emitted toward the optical members disposed downstream from the first lens L1 and the like. Here, the second lens L2 may also be referred to as a display side lens, in relation to the first lens L1 (the observer side lens). The second lens L2 is a convex lens that is a dioptric lens with a refraction index of 1.55 or greater, for example, so as to obtain a sufficiently wide angle image.

The third lens L3 is provided upstream from the second lens L2 that is the display side lens, and is an achromatic lens for which the Abbe number and the like is appropriately adjusted. The third lens L3 functions as a lens with an achromatizing purpose, and is a concave lens provided so as to be joined to the second lens L2. In particular, here, the third lens L3 is joined to the second lens L2 to sandwich the half mirror 21 between the third lens L3 and the second lens L2. In other words, by disposing the third lens L3 that has the negative power with the small Abbe number between the half mirror 21 and the semi-transparent polarizing plate 23, chromatic aberration can be suppressed.

The fourth lens L4 is a convex lens that is provided immediately downstream from the image display device 210, and emits the image light GL from the image display device 210 toward the optical members disposed downstream from the third lens L3 onward. In other words, of the eyepiece optical system 220, the fourth lens L4 is an upstream side lens that is disposed in a position closest to the image display device 210, and adjusts the optical path of the image light GL. By introducing the fourth lens L4, a resolution performance can be improved, and further, a panel size in the image display device 210 can be reduced. In addition, since a telecentric angle of the light beam emitted from the image display device 210 can also be suppressed, changes occurring in luminance and hue caused by characteristics of a viewing angle of a panel can further be suppressed.

As described above, the half mirror 21 is a semi-transparent film that allows some of the image light GL to pass through and reflects back some of the image light GL, is constituted, for example, by a dielectric multilayer film and the like, and is formed between the second lens L2 and the third lens L3, having a concave curved surface shape as seen from the observer side.

Of the optical element OP, the polarization converting member 22 is a member for converting the polarization of the light passing through, and here, is constituted by a quarter wave plate (a second quarter wave plate, or a second λ/4 board). The polarization converting member 22 is provided between the second lens L2 that is the display side lens, and the semi-transparent polarizing plate 23, and converts the polarization of the components traveling back and forth between the polarization converting member 22 and the half mirror 21, such as a component moving toward the semi-transparent polarizing plate 23 and the like. Here, the image light GL that is in the circularly polarized state is converted to the linearly polarized light, or, in contrast, the image light GL that is in the linearly polarized state is converted to the circularly polarized light.

Of the optical element OP, the semi-transparent polarizing plate 23 is a member provided between the second lens 2L that is the display side lens, and the first lens L1 that is the observer side lens. Here, the semi-transparent polarizing plate 23 is constituted by a reflecting wire grid polarizing plate. Here, a direction A1 of a polarized light transmission axis of the semi-transparent polarizing plate 23 that is the reflecting wire grid polarizing plate is the horizontal direction (the X direction) that is the direction in which the eyes EY are arranged side by side. Note that the semi-transparent polarizing plate 23 constituted by the reflecting wire grid polarizing plate changes transmission/reflection characteristics in accordance with the state of polarization of an incident component, and thus, is sometimes also referred to as a reflection-type polarizing plate.

Below, the optical path of the image light GL will be briefly described. Here, as described above, for the semi-transparent polarizing plate (or the reflection-type polarizing plate) 23 configured by the wire grid polarizing plate, the horizontal direction (the X direction) is the polarized light transmission axis. In other words, the semi-transparent polarizing plate 23 has characteristics to transmit the polarized components in the X direction and to reflect back the components that are perpendicular to the X direction. Further, the optical path of the illustrated image light GL is a path that passes in a plane parallel to the XZ plane. Thus, in the drawings, when prescribing P-polarized light and S-polarized light, a plane of incidence is a plane parallel to the XZ plane, and a boundary surface is considered as a plane that is perpendicular to the XZ plane (a plane parallel to the Y direction). The semi-transparent polarizing plate 23 transmits the P-polarized light and reflects back the S-polarized light.

With respect to the above, first, the image light GL that is modulated by the panel unit 11 of the image display device 210 and emitted is converted to P-polarized light by the polarizing plate 12 that is a transmissive wavelength plate and after that, is converted to the circularly polarized light by the first quarter wave plate 13, and emitted toward the eyepiece optical system 220. Subsequently, in the eyepiece optical system 220, the image light GL passes through the fourth lens L4, is incident to the third lens L3, and reaches the half mirror 21 formed as the film on the boundary surface between the third lens L3 and the second lens L2. Of the image light GL, some components pass through the half mirror 21, are converted to the S-polarized light by the polarization converting member 22 that is the second quarter wave plate, and reach the semi-transparent polarizing plate (or the reflection-type polarizing plate) 23. Here, the image light GL that is the S-polarized light is reflected back by the semi-transparent polarizing plate 23, once more becomes the circularly polarized light at the polarization converting member 22, and reaches the half mirror 21. At the half mirror 21, some components of the image light GL pass through as they are, but the remaining components are reflected back, and the components of the reflected image light GL are this time converted to the P-polarized light by the polarization converting member 22. The components of the image light GL that have become the P-polarized light pass through the semi-transparent polarizing plate 23, and reach the first lens L1 (the observer side lens). After passing through the first lens L1, the image light GL reaches the position assumed to be the location of the eye EY of the observer. In this case, the optical path is bent by providing the half mirror 21 on the optical path, achieving a wide viewing angle while realizing downsizing, and at the same time, by providing the polarization converting member 22 between the half mirror 21 and the semi-transparent polarizing plate 23, the polarization of the components traveling back and forth between the half mirror 21 and the semi-transparent polarizing plate 23 can be appropriately converted, the occurrence of ghost light is suppressed, and high quality image can be visually recognized by the observer.

In the above type of case, as described above, the micro structure portion MS can be formed on the lens surfaces S1 to S3, for example, of the lenses L1 to L4 constituting the eyepiece optical system 220.

Firstly, the lens surface S1 is a surface on a side of the lens L1 that is on the observer side, namely, on the side closest to the observer. Thus, when the micro structure portion MS is formed on the lens surface S1, the diffusion effect can be imparted to the image light GL at its most magnified state along the optical path.

Further, the lens surface S2 is a flat surface on which the polarization converting member 22 is provided. Here, the lens surface S2 is provided between the polarization converting member 22 and the second lens L2. In this case, when the micro structure portion MS is formed on the lens surface S2, the micro structure portion MS can be configured, for example, by a sheet-shaped diffusion member. In addition, as on the lens surface S3, the micro structure portion MS can be formed, along with the half mirror 21, on the curved surface on which the half mirror 21 is formed. Note that the lens surfaces S2 and S3 are also in positions that are relatively separated from the image display device 210, and thus, the image light GL on the optical path can be thought to be in a magnified state to a certain extent. Further, as described above, the light passes through the lens surfaces S2 and S3 three times in total, and thus, the diffusion effect is also approximately three-fold. Thus, the micro structure portion MS is formed that has a shape or a structure based on the above aspect. Further, when the micro structure portion MS is provided on the lens surfaces S2 and S3, the micro structure portion MS provided on the lens is formed while being joined to the other lenses configuring the eyepiece optical system 220. Specifically, when the micro structure portion MS is provided on the lens surface S3, for example, the concave-convex structure portion that becomes the micro structure portion MS is formed on the third lens L3 along with the dielectric multilayer film that becomes the half mirror 21, and the micro structure portion MS is formed along with the other portions by joining the third lens L3 and the second lens L2 while sandwiching the micro structure portion MS and the half mirror 21. In this case, the micro structure portion MS is in a state of being sandwiched between the lenses, and the deposition of dirt and the like to the micro structure portion MS can be avoided. Further, when the third lens L3 and the second lens L2 are the lenses made of resin, the manufacture of the above-described lens unit including the manufacture of the micro structure portion MS can be relatively easily performed.

As described above, in Second Exemplary Embodiment also, the appropriate extent of the diffusion effect can be imparted to the image light GL with a relatively simple configuration taking into account the size of each of the pixels constituting the image element, the gaps between the pixels are made less noticeable, and the favorable state of visibility of the image can be obtained. In particular, in Second Exemplary Embodiment, the micro structure portion MS can be provided in various locations in the eyepiece optical system 220.

Third Exemplary Embodiment

Below, a virtual display apparatus according to Third Exemplary Embodiment will be described with reference to FIG. 7. The virtual display apparatus according to Third Exemplary Embodiment is the same as the virtual display apparatus according to First Exemplary Embodiment, except that a range over which the micro structure portion is provided, and thus the same reference signs are assigned to the members having the same functions as in the case of First Exemplary Embodiment, and a detailed description of the overall structure and the like is omitted.

Figure 7:
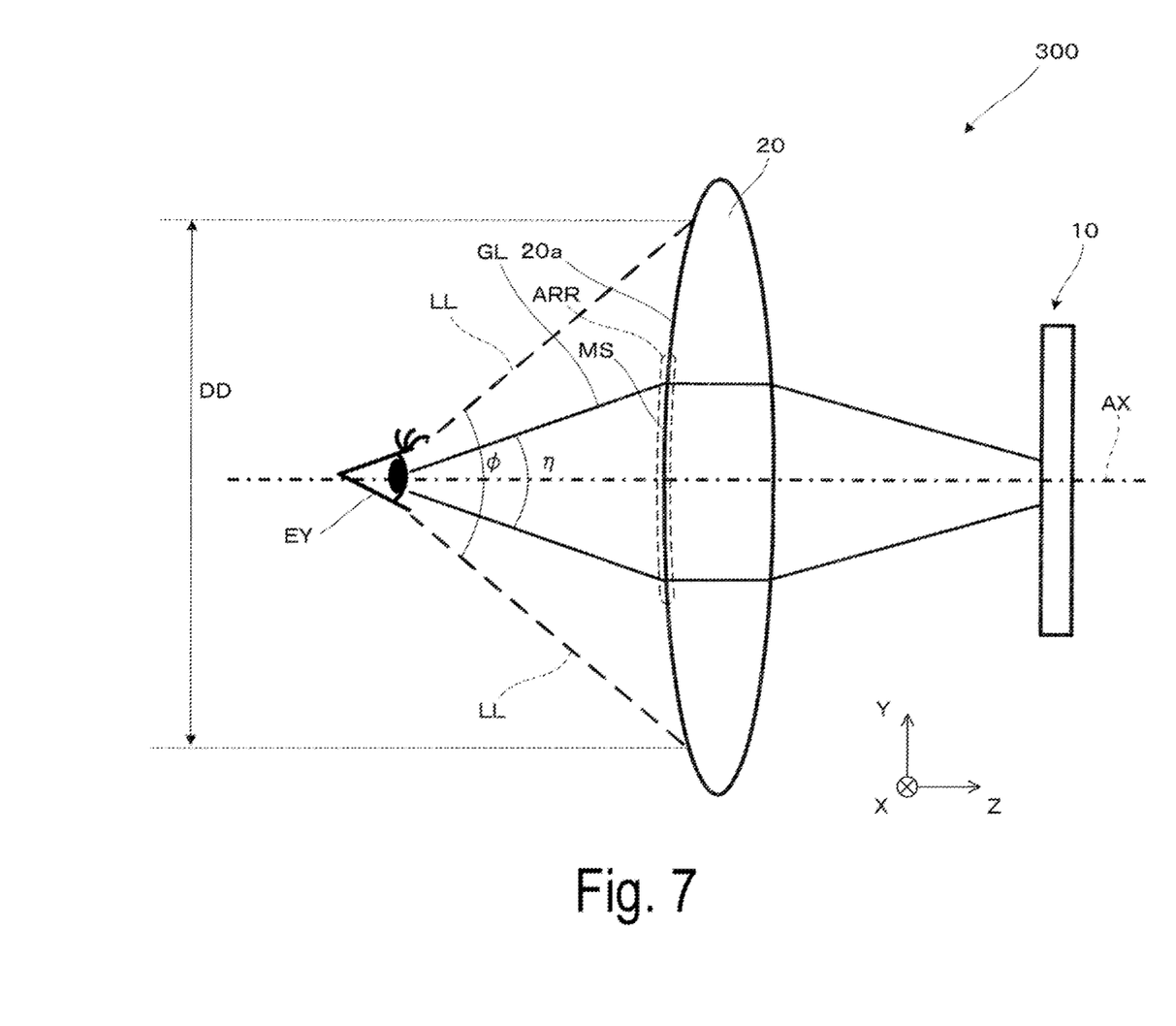
FIG. 7 is a diagram illustrating the virtual display apparatus according to Third Exemplary Embodiment.

A virtual display apparatus 300 according to Third Exemplary Embodiment illustrated in FIG. 7 includes the image display device 10 that is the image element, the eyepiece optical system 20, and the micro structure portion MS.

Third Exemplary Embodiment differs from the case of First Exemplary Embodiment in that, when the micro structure portion MS is provided on the lens surface 20a, the micro structure portion MS is not provided over the whole of the lens surface 20a, and is only provided on a part, at a center side, close to the optical axis AX, of the effective diameter of the eyepiece optical system 20 (the lens LS).

As described above, in line with the widening of the angle of view of the virtual display apparatus in general, in Third Exemplary Embodiment also, the maximum value of the angle of view (FOV) is designed to exceed 50 degrees. In other words, a range of an angle of view, as a visible range illustrated by dashed lines LL corresponding to an effective diameter DD in FIG. 7, is sufficiently large. In the case of Third Exemplary Embodiment, a field of view (FOV) Φ, namely, the maximum value Φ of the angle of view (viewing angle), is determined by the arrangement, the size, and the like of the image display device 10 and the eyepiece optical system 20.

On the other hand, with respect to a human visual field, an effective visual field that is optimum for information receptivity is 30 degrees horizontally, and 20 degrees vertically. From this, of a visual field that can actually be seen, an area that can be recognized as information is thought to be approximately 30 degrees at most, and from the viewpoint of maintaining favorable visibility while also progressing the widening of the angle of view, a high degree of resolution is maintained in this area. Specifically, even when causing the gaps between the pixels to be less noticeable and maintaining the favorable state of visibility of the image, it is sufficient to deal with the effective visual field that is optimum for information receptivity, and the resolution of peripheral areas may not have to be so high.

Here, in Third Exemplary Embodiment, while taking into account the above-described human visual field characteristics, the micro structure portion MS is provided only on an area ARR, of the lens surface 20a, that at least covers a range of η=30 degrees of an angle of view (viewing angle) that is narrower than the maximum value Φ, or a range of approximately the same extent as the range η=30 degrees.

Note that, in the case of the HMD with the wide angle of view that exceeds an FOV of 50 degrees, as in the application, many HMDs are provided with a known head tracking function, for example, and when the observer wishes to view a peripheral section, the observer moves his or her head and not his or her eyes. Thus, a line of sight of the observer is in a state of being constantly oriented toward the vicinity of the center of the image, and there is almost no case in which the line of sight is oriented toward the peripheral section. Thus, in this type of case, in particular, the area with the high resolution as the image display is limited to the center area of the image display, and peripheral areas are not thought to require such high resolution. Further, it goes without saying that the head tracking function is not limited to Third Exemplary Embodiment only, and the head tracking function can be provided in other exemplary embodiments.

As described above, in Third Exemplary Embodiment also, the appropriate extent of the diffusion effect can be imparted to the image light with a relatively simple configuration taking into account the size of each of the pixels constituting the image element, the gaps between the pixels are made less noticeable, and the favorable state of visibility of the image can be obtained. In particular, in Third Exemplary Embodiment, the range over which the micro structure portion is provided is limited, thus providing a simple structure, and at the same time, in relation to human power of vision, the state of the image of the effective visual field that is optimum for information receptivity can be maintained.

Other Exemplary Embodiments

The disclosure is explained in line with each of the above-described exemplary embodiments, but the disclosure is not limited to each of the above-described exemplary embodiments, and various embodiments can be realized without departing from the spirit and the scope of the disclosure.

For example, the refraction index difference Δn may change when a material is changed, and also due to adhesive that is used, when the adhesive is used to attach the concave-convex structure portion US when providing the micro structure portion MS. Conversely, the value of the maximum inclination angle θ is adjusted, namely, the shape of the concave-convex structure portion US in the micro structure portion MS is determined by the magnitude of the refraction index difference Δn.

The technology of the disclosure is not limited to the so-called closed-type (not see-through) virtual display apparatus that causes the image light only to be visually recognized, and the technology of the disclosure may be applied to the virtual display apparatus that can cause the observer to visually recognize or observe an image of the outside world in a see-through manner.

Further, for example, the technology of the disclosure may be applied to a so-called image see-through product constituted by a display and an imaging device. In addition, the technology of the disclosure may be applied to a handheld type display.

Figure 8:
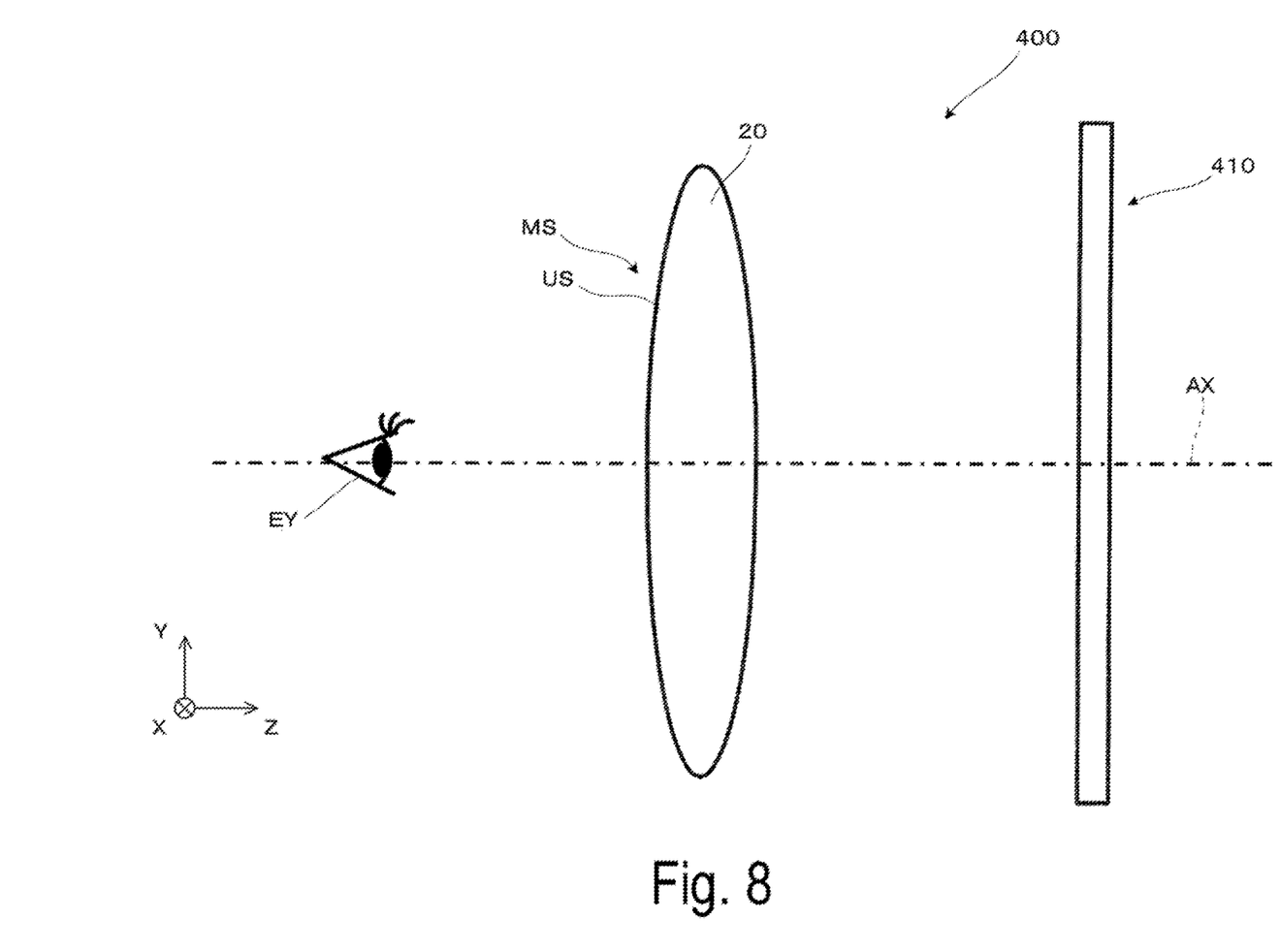
FIG. 8 is a diagram schematically illustrating the variation example of the virtual display apparatus.

Further, the technology of the disclosure may be applied to a case in which an image display device 410 constituted by a large panel is used, as in a virtual display apparatus 400 illustrated in FIG. 8, namely, when the image display device 410 that is larger than the eyepiece optical system 20 is used.

Further, as the image display device, in addition to the above-described devices, an HTPS as a transparent liquid crystal display, or various other devices can be used. For example, a configuration can be adopted that uses a reflective liquid crystal display, and in place of the image display device that is formed from a liquid crystal display device and the like, a digital micro-mirror device and the like can be used.

Figure 9:
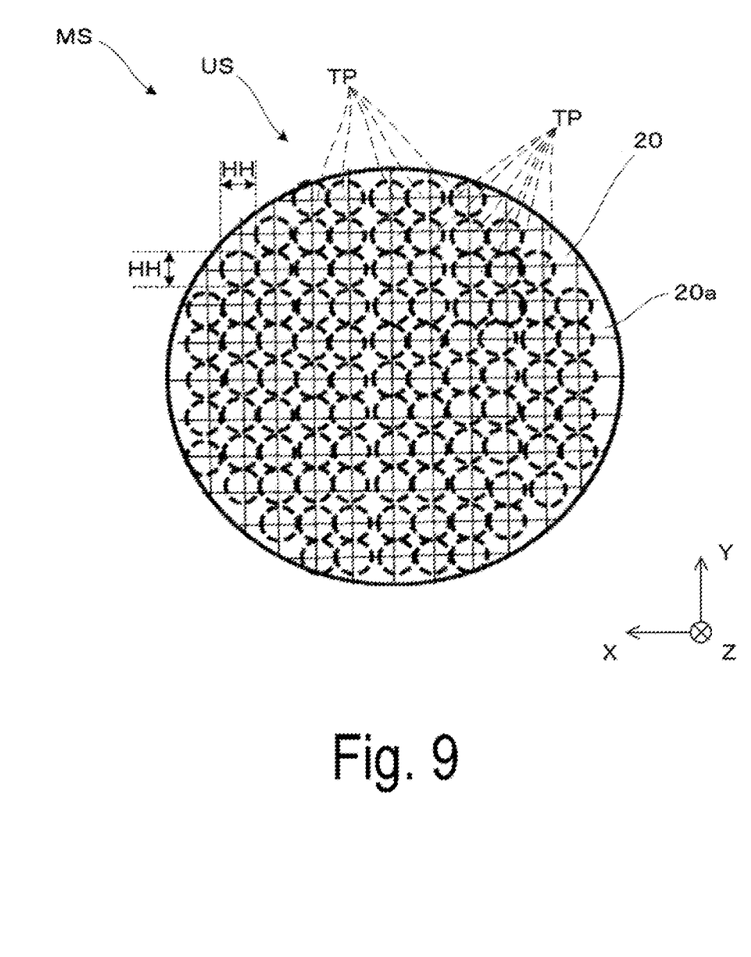
FIG. 9 is a diagram schematically illustrating a variation example of the micro structure portion in the virtual display apparatus.

Further, in the above description, as exemplified with reference to FIG. 2, in relation to the concave-convex structure portion US provided over the whole of the lens surface 20a of the eyepiece optical system 20, the many hemispherical convex portions TP, TP, and so on are disposed at random in an aperiodic manner and have differing sizes to a certain extent. However, as in the variation example illustrated in FIG. 9, the concavities and convexities may be formed to have the same or substantially the same size and shape as each other, and may be disposed in a periodic manner. Specifically, as illustrated in FIG. 9, a configuration can be adopted in which the diameter HH is a constant value of an interval from 0.05 mm to 2 mm, and the configuration has a periodic pitch width.

Further, when an opening width between the eyes EY of the observer is denoted by d, it is conceivable that the diameter HH, the width t of the single pixel PX, and the opening width d satisfy a relationship 2t<HH<d/3. In this way, a case in which the concavities and convexities are too large and are visible to the eye, and a case in which interference becomes strong due to the concavities and convexities being too small can be avoided.

What is claimed is:

1. A virtual display apparatus comprising:
an image element configured to emit image light;
an eyepiece optical system configured to cause the image light from the image element to be visually recognized as an image of a virtual image; and
a micro structure portion provided on the eyepiece optical system and configured to diffuse the image light, wherein
the virtual display apparatus satisfies an expression below:

$$0.2 \frac{t}{f} < \Delta n \tan\theta < \frac{t}{f}$$

where $\Delta n$ is a refraction index difference of a medium before and after a micro structure surface of the micro structure portion, $\theta$ is a maximum inclination angle of the micro structure surface with respect to an optical axis, t is a width of a single pixel constituting the image element, and f is a focal distance of a whole optical system.

2. The virtual display apparatus according to claim 1, wherein
the micro structure portion includes a concavity and a convexity that are finer than a width of a luminous flux of the image light corresponding to the width t of the single pixel constituting the image element.

3. The virtual display apparatus according to claim 1, wherein
the micro structure portion includes a concave-convex structure portion constituted by the concavity and the convexity of a size within a range from 0.05 mm to 2 mm.

4. The virtual display apparatus according to claim 3, wherein
in the micro structure portion, the concave-convex structure portion includes the concavity and the convexity having different sizes within the range, and being aperiodically disposed.

5. The virtual display apparatus according to claim 1, wherein
the micro structure portion is formed on a surface closest to an observer side, of the eyepiece optical system.

6. The virtual display apparatus according to claim 1, wherein
the micro structure portion is provided on a resin lens, of lenses constituting the eyepiece optical system, and is formed to join another lens constituting the eyepiece optical system.

7. The virtual display apparatus according to claim 1, wherein
the eyepiece optical system is constituted by a resin lens.

8. The virtual display apparatus according to claim 1, wherein
the eyepiece optical system is constituted by a glass mold lens.

9. The virtual display apparatus according to claim 1, wherein
the micro structure portion is a sheet-shaped diffusion member.

10. The virtual display apparatus according to claim 1, wherein
the micro structure portion is provided only on a part, at a center side, of an effective diameter of a lens constituting the eyepiece optical system.

* * * * *